United States Patent
Lyons, Jr.

[11] Patent Number: 5,833,292
[45] Date of Patent: Nov. 10, 1998

[54] STRAP APPARATUS FOR CARRYING RELATIVELY LARGE OBJECTS

[76] Inventor: Thomas F. Lyons, Jr., 6953 County Rd. D, Olney Springs, Colo. 81062

[21] Appl. No.: 890,629

[22] Filed: Jul. 9, 1997

[51] Int. Cl.[6] .................................................. B65D 63/18
[52] U.S. Cl. .......................................... 294/152; 294/157
[58] Field of Search ............................ 294/74, 137, 141, 294/149, 150, 152, 157, 165

[56] References Cited

U.S. PATENT DOCUMENTS

| | | | |
|---|---|---|---|
| 2,359,193 | 9/1944 | Bechik | 16/125 |
| 2,431,780 | 12/1947 | Theal | 294/74 |
| 3,214,072 | 10/1965 | Brown | 224/29 |
| 3,701,559 | 10/1972 | Marino et al. | 294/74 |
| 4,119,250 | 10/1978 | Brutlag | 224/49 |
| 4,431,226 | 2/1984 | Weilert | 294/150 |
| 4,521,045 | 6/1985 | Hart | 294/149 |
| 4,553,780 | 11/1985 | Strachan | 294/152 |
| 5,102,178 | 4/1992 | Staats, Jr. | 294/152 |
| 5,503,448 | 4/1996 | Dewey | 294/152 |

FOREIGN PATENT DOCUMENTS

| | | | |
|---|---|---|---|
| 406541 | 11/1924 | Germany | 294/149 |
| 2208641 | 4/1989 | United Kingdom | 294/74 |

*Primary Examiner*—Dean Kramer
*Attorney, Agent, or Firm*—Klaas, Law, O'Meara & Malkin; Joseph J. Kelly

[57] ABSTRACT

At least three straps, each comprising a body portion and a buckle, are linked together to be used in carrying a relatively large object. The middle strap contacts the bottom surface of the relatively large object and the strap connected to each end of the middle strap contacts portions of the bottom surface and portions of relatively large opposite surfaces of the relatively large object. At least the end straps are adjustable to compensate for differences in the physical characteristics of the persons carrying the relatively large object.

20 Claims, 1 Drawing Sheet

U.S. Patent     Nov. 10, 1998     5,833,292
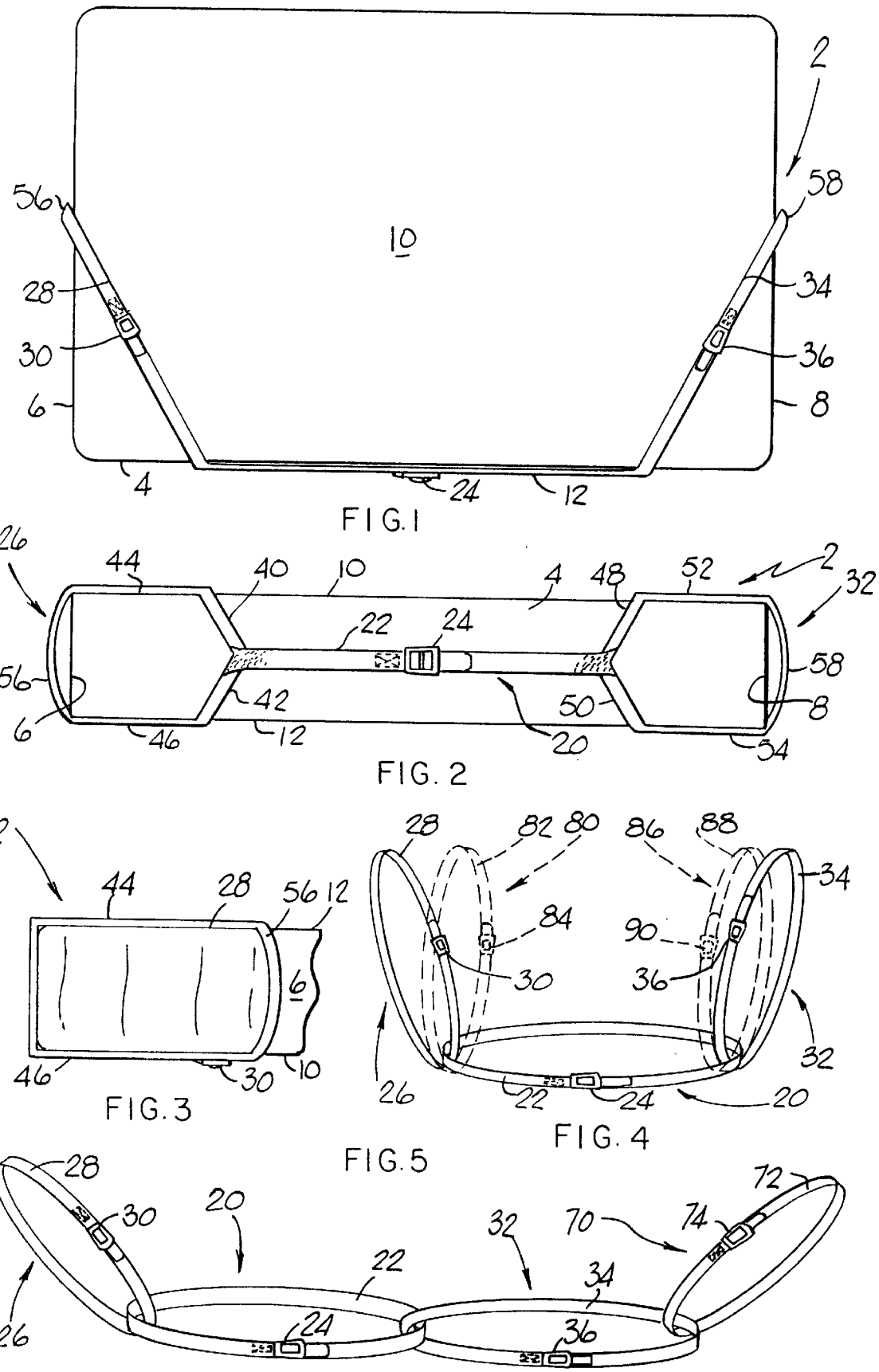

5,833,292

STRAP APPARATUS FOR CARRYING RELATIVELY LARGE OBJECTS

FIELD OF THE INVENTION

This invention relates generally to apparatus for use in carrying relatively large objects and more particularly to the use of conventional straps assembled together to function as an effective apparatus for carrying relatively large objects.

BACKGROUND OF THE INVENTION

There have been several types of apparatus marketed for use in carrying relatively large objects, such as a mattress. Some of these are described in U.S. Pat. Nos. 3,214,072; 5,102,178 and 5,503,448. However, each of the apparatus disclosed in these patents have features that are not particularly desirable. For example, the apparatus in each of these patents is limited to a particular use and is not readily adaptable for other uses. When not used in accordance with this invention, the belts of this application can be used in a customary manner.

BRIEF DESCRIPTION OF THE INVENTION

This invention provides apparatus for carrying relatively large objects wherein the apparatus comprises conventional straps assembled together to function as an effective apparatus for the carrying of a relatively large object.

In a preferred embodiment of the invention, the apparatus comprises three straps each of which has a body portion and a buckle to cooperate in forming a looped strap when a portion of the body portion is connected to the buckle. After the first strap has been formed into a looped strap, the body portion of each of the other two straps is threaded through the looped first strap and connected to its buckle to form three linked looped straps then can be used to carry relatively large objects such as a mattress, mirror, glass table tops, plywood, sheetrock, water bed frames, pool tables and any other relatively large object that is heavy or cumbersome to carry. The relatively large object will have at least a bottom surface, opposite side surfaces and relatively large opposite surfaces. The three linked looped straps comprise a middle strap and two opposite end straps. In use, the middle strap is positioned to contact the bottom surface of the relatively large object. Each end strap is positioned so that portions thereof contact portions of the bottom surface and other portions thereof extend outwardly from each side of the bottom surface. The relatively large object is to be carried by two persons. The first person will grasp a portion of one end strap and lift it upwardly so that other portions of the one end strap will contact opposite portions of the relatively large opposite surfaces. The second person will grasp a portion of the other end strap and lift it upwardly so that portions of the other end strap will contact other opposite portions of the relatively large opposite surfaces. Each of the end straps are adjustable so that each may be adjusted to compensate for any difference in the physical characteristics of the two persons.

In another preferred embodiment of the invention, the body portion of a fourth strap is threaded through one of the looped end straps and connected to its buckle to form four linked looped straps comprising two middle straps and two opposite end straps. In use, the two middle straps are positioned to contact the bottom surface of the relatively large object and the two opposite end straps are positioned and used as described above.

In another preferred embodiment of the invention, the body portion of each of two additional straps is threaded through the looped first strap and connected to its buckle to form four looped straps linked to the looped first strap. This embodiment of the invention is used to carry a relatively large object which is also relatively heavy and requires four persons to carry the relatively large and heavy object. In use, the five looped straps comprise a middle strap having opposite end portions with two looped end straps at one of the opposite end portions and two looped end straps at the other of the opposite end portions. In use, the middle strap is positioned so as to contact the bottom surface. The end straps are positioned as described above so as to have portions in contact with the bottom surface and other portions extending outwardly from the bottom surface. A first person will grasp a portion of a first end strap and lift upwardly to move portions thereof into contact with opposite portions of the relatively large opposite surfaces. The second, third and fourth persons will do the same with a portion of the second, third and fourth end straps. Each of the end straps is adjustable to compensate for any differences in the physical characteristics of the four persons. If the relatively large object is only heavy at one end thereof, four linked loop strap s may be used with two of the linked looped straps at the heavy end.

BRIEF DESCRIPTION OF THE DRAWING

Illustrative and presently preferred embodiments of the invention are illustrated in the drawing in which:

FIG. 1 is a front elevational view of the apparatus of one preferred embodiment of the invention in position on a relatively large object;

FIG. 2 is a bottom plan view of FIG. 1;

FIG. 3 is a partial end elevational view from the left side of FIG. 1;

FIG. 4 is a pictorial view of two preferred embodiments of the invention; and

FIG. 5 is a pictorial view of another preferred embodiment of the invention.

DETAILED DESCRIPTION OF THE INVENTION

In FIGS. 1–4, there is illustrated one preferred embodiment of the apparatus 2 of this invention. The apparatus 2 is used to carry a relatively large object such as a mattress or other large object, having a bottom surface 4, opposite side surfaces 6 and 8 and relatively large opposite surfaces 10 and 12.

The apparatus 2 comprises a first looped strap 20 comprising a body portion 22 having an end portion that has been connected to a buckle 24; a second looped strap 26 comprising a body portion 28 having an end portion that has been connected to a buckle 30 and a third looped strap 32 comprising a body portion 34 having an end portion that has been connected to a buckle 36. Prior to connecting the body portions 28 and 34 to the buckles 30 and 36, the end portions thereof are threaded through the first looped strap 20 so as to link the first, second and third looped straps 20, 26 and 32 together.

In use, the first looped strap 20 is positioned to contact the bottom surface 4. The second looped strap 26 is positioned so that portions 40 and 42 contact the bottom surface 4 and portions 44 and 46 extend outwardly from the bottom surface 4 (not shown). The third looped strap 32 is positioned so that portions 48 and 50 contact the bottom surface 4 and portions 52 and 54 extend outwardly from the bottom surface 4 (not shown). A first person (not shown) grasps a portion 56 of the second looped strap 26 and lifts the portion 56 upwardly, as viewed in FIG. 1, to move the portions 44 and 46 into contact with opposite portions of the relatively large opposite surfaces 10 and 12. A second person (not shown) grasps a portion 58 of the third looped strap 32 and lifts the portion 58 upwardly, as viewed in FIG. 1, to move the portions 52 and 54 into contact with opposite other portions of the relatively large opposite surfaces 10 and 12. Prior to lifting the relatively large object, the second and third looped straps 26 and 32 are each adjusted so that the length thereof is sufficient to compensate for any differences in the physical characteristics of the first and second persons.

In FIG. 5, there is illustrated another preferred embodiment of the invention. The apparatus further comprises a fourth looped strap 70 comprising a body portion 72 having an end portion that has been connected to a buckle 74. Prior to connecting the body portion 72 to the buckle 74, the end portion is threaded through the third looped strap 32 so as to link the fourth looped strap 70 to the third looped strap 32.

The apparatus of FIG. 5 is used in a manner similar to that illustrated in FIGS. 1–3. The first and third looped straps are positioned so as to contact the bottom surface 4. The second looped strap 26 is positioned and used in the same manner as described above. The fourth looped strap 70 is positioned and used in the same manner as described above in relation to the third looped strap 32.

Another preferred embodiment of the invention relates to additional straps which are illustrated in FIG. 4 in dashed lines. The apparatus further comprises a fourth looped strap 80 comprising a body portion 82 having an end portion connected to a buckle 84 and a fifth looped strap 86 having a body portion 88 having an end portion connected to a buckle 90. Prior to connecting the body portions 82 and 88 to the buckles 84 and 90, the end portions thereof are threaded through the first looped strap 20 so as to link the fourth and fifth looped straps 80 and 86 to the first looped strap 20. In use, the second and fourth looped straps 26 and 80 are located adjacent to each other and the third and fifth looped straps 32 and 86 are located adjacent to each other. The apparatus illustrated by the solid and dashed lines in FIG. 4 is used to carry a relatively large object that is also very heavy and requires four persons to carry it.

In use of the complete apparatus illustrated in FIG. 4 (not shown), the first looped strap 20 is positioned to contact the bottom surface 4. The second and fourth looped straps 26 and 28 are positioned similarly to the positioning of the second looped strap 26 described above. The third and fifth looped straps 32 and 86 are positioned similarly to the positioning of the third looped strap 32 described above. A first person (not shown) grasps the portion 56 of the second looped strap 26 and lifts upwardly to move the portions 44 and 46 into contact with portions of the relatively large opposite surfaces 10 and 12. A second person (not shown) grasps a portion of the fourth looped strap 80, similar to the portion 56, and lifts upwardly to move portions of the fourth looped strap 80, similar to the portions 44 and 46, into contact with other portions of the relatively large opposite surfaces 10 and 12 or to overlap portions of the portions 44 and 46. A third person (not shown) grasps the portion 58 of the third looped strap 32 and lifts upwardly to move the portions 52 and 54 into contact with other portions of the relatively large opposite surfaces 10 and 12. A fourth person (not shown) grasps a portion of the fifth looped strap 86, similar to the portion 58, and lifts upwardly to move portions of the fifth looped strap 86, similar to the portions 52 and 54, into contact with other portions of the relatively large opposite surfaces 10 and 12 or to overlap portions of the portions 52 and 54. Prior to lifting the relatively large object, the second, third, fourth and fifth looped straps 20, 26, 32, 80 and 86 are each adjusted so that the length thereof is sufficient to compensate for any differences in the physical characteristics of the first, second, third and fourth persons.

If the relatively heavy, relatively large object is heavy only at one end, for example the right end of FIG. 4, the looped strap 80 can be eliminated.

The straps used in forming the apparatus of this invention are of the type marketed by U.S.A. Products under the designation of Part No. 160096. The body portion is formed from one inch wide weather resistant polypropylene webbing and the buckle is mar proof. Preferably the straps are of the same length which, in the product described above, is nine feet. If desired, other straps can be color coded and come with directions for the assembly thereof. The use of color coding is particularly useful when the same two persons are using the linked looped straps. By placing each colored strap at an indicated location, there is no need to repeatedly adjust the straps.

It is contemplated that the inventive concepts herein described may be variously otherwise embodied and it is intended that the appended claims be constructed to include alternative embodiments of the invention except insofar as limited by the prior art.

What is claimed is:

1. Strap apparatus comprising a plurality of straps for use in carrying a relatively large object having at least a bottom surface, opposite side surfaces and relatively large opposite surfaces comprising:

at least three looped straps;

each of said at least three looped straps being adjustable;

each of said at least three looped straps comprising an elongated body portion and a securing buckle for permitting adjustment of the length of said elongated body portion and for holding each of said at least three looped straps at a desired length;

at least one of said at least three looped straps being located so as to contact only said bottom surface;

portions of the remaining at least two adjustable looped straps being located to contact at least portions of said bottom surface and each of said relatively large opposite surfaces; and at least two of said at least three looped straps being linked to another of said at least three looped straps by securing the elongated body portion of a first one of said at least three looped straps to said securing buckle to form a first looped strap; threading the elongated body portions of each of the second and third looped straps of said at least three looped straps through said first looped strap and securing said elongated body portions of said second and third looped straps to its associated buckle so that, when a force is applied thereto, any portion of one of said at least three looped straps will move into contact with any portion of another of said at least three looped straps.

2. Strap apparatus as in claim 1 wherein:

each of said plurality of straps is color coded for identification and interchangeability.

3. Strap apparatus as in claim 1 wherein:

each of said looped straps consisting only of said elongated body portion and said securing buckle for permitting adjustment of the length of said elongated body portion and for holding said looped strap at a desired length.

4. Strap apparatus as in claim 3 wherein:

said elongated body portion and said buckle are formed from a non-marring material.

5. Strap apparatus as in claim 4 wherein:

all of said at least three looped straps having elongated body portions of substantially the same length.

6. Strap apparatus as in claim 1 wherein said plurality of straps comprise:

at least four looped straps;

at least two of said at least four looped straps being in contact with only said bottom surface; and each of said at least four looped straps being linked together with only two adjacent ones of said at least four looped straps.

7. Strap apparatus as in claim 6 wherein:

all of said at least four looped straps are adjustable.

8. Strap apparatus as in claim 7 wherein:

each of said at least four looped straps consisting only of said elongated body portion and said securing buckle for permitting adjustment of the length of said elongated body portion and for holding said looped strap at a desired length.

9. Strap apparatus as in claim 8 wherein:

said elongated body portion and said buckle are formed from a non-marring material.

10. Strap apparatus as in claim 9 wherein:

all of said at least four looped straps having elongated body portions of substantially the same length.

11. Strap apparatus as in claim 1 wherein said plurality of straps comprise:

at least five looped straps; and only one of said at least five looped straps being linked to the other four of said at least five looped straps.

12. Strap apparatus as in claim 11 wherein:

all of said at least five straps are adjustable.

13. Strap apparatus as in claim 12 wherein:

each of said looped straps consisting only of said elongated body portion and said buckle for permitting adjustment of the length of said elongated body portion and for holding said looped strap at a desired length.

14. Strap apparatus as in claim 13 wherein:

said elongated body portion and said buckle are formed from a non-marring material.

15. Strap apparatus as in claim 14 wherein:

all of said five looped straps having elongated body portions of substantially the same length.

16. Method for carrying a relatively large object having at least a bottom surface, opposite side surfaces and relatively large opposite surfaces comprising:

providing at least three elongated straps, each consisting only of an elongated body portion and a buckle;

connecting said elongated body portion of each of said at least three elongated straps to said buckle thereof to form at least three looped straps;

linking two of said at least three looped straps to the other of said at least three looped straps during said connecting operation so that, when a force is applied thereto, any portion of one of said at least three linked together looped straps will move into contact with any portion of another of said linked together looped straps;

placing at least one of said linked looped straps against only said bottom surface;

placing a second one of said linked looped straps into contact with at least portions of said bottom surface so that a first person, who is to carry the relatively large object, can grasp one portion of said second one of said linked looped straps so that, when said one portion is lifted upwardly, other portions of said second one of said linked looped straps will move into contact with portions of said relatively large opposite surfaces; and placing a third one of said linked looped straps into contact with at least other portions of said bottom surface so that a second person, who is to carry the relatively large object, can grasp a portion of said third one of said linked looped straps so that, when said portion is lifted upwardly, other portions of said third one of said linked looped straps will move into contact with other portions of said relatively large opposite surfaces.

17. Method as in claim 16 and further comprising:

adjusting said second one and said third one of said linked looped straps to compensate for the physical characteristics of said first and said second persons.

18. Method as in claim 16 and further comprising:

providing at least two additional straps, each having only an elongated body portion and a buckle;

connecting said elongated body portion of each of said at least two additional straps to said buckle thereof to form at least five looped straps;

linking said at least two additional looped straps to said other of said at least three looped straps during said connecting operation so that a fourth one of said linked looped straps will cooperate with said second one of said linked looped straps and a fifth one of said linked looped straps will cooperate with said third one of said linked looped straps;

placing portions of said fourth one of said at least five linked looped straps into contact with said bottom surface at least adjacent to said second one of said linked looped straps so that a third person, who is to carry the relatively large object, can grasp a portion of said fourth one of said linked looped straps so that, when said portion is lifted upwardly, other portions of said fourth one of said linked looped straps will move into contact with portions of said relatively large opposite surfaces; and placing portions of said fifth one of said linked looped straps into contact with portions of said bottom surface at least adjacent to said third one of said linked looped straps so that a fourth person, who is to carry the relatively large object, can grasp a portion of said fifth one of said linked looped straps so that, when said portion is lifted upwardly, other portions of said fifth one of said linked looped straps will move into contact with portions of said relatively large opposite surfaces.

19. Method as in claim 18 and further comprising:

adjusting said second, third, fourth and fifth linked looped straps to compensate for the physical characteristics of said first, second, third and fourth persons.

20. Method as in claim 16 and further comprising:

providing at least one additional strap having only an elongated body portion and a buckle;

connecting said elongated body portion of said at least one additional strap to said buckle thereof to form at least four looped straps;

linking said at least one additional looped strap to only one of said at least three looped straps during said connecting operation; and placing portions of at least two of said at least four linked looped straps into contact with only said bottom surface so that, when said relatively large object is lifted upwardly, other portions of said remaining two of said at least four linked looped straps will move into contact with portions of said relatively large opposite surfaces.

* * * * *